Patented Sept. 28, 1948

2,449,993

UNITED STATES PATENT OFFICE 2,449,993

PREPARATION OF BETA-HALO CARBOXYLIC ACIDS

Thomas L. Gresham and Forrest W. Shaver, Akron, Ohio, assignors to The B. F. Goodrich Company, New York, N. Y., a corporation of New York No Drawing. Application October 5, 1945, Serial No. 620,666

3 Claims. (Cl. 260—539)

This invention relates to the preparation of beta-chloro and beta-bromo carboxylic acids, and pertains more specifically to the preparation of such compounds by the reaction of hydrogen chloride and hydrogen bromide with a beta-lactone.

It is disclosed in U. S. Patent 2,356,459 to Frederick E. Küng that beta-lactones, that is, lactones or inner esters of beta-hydroxy carboxylic acids, may be obtained in good yield by the reaction of a ketene with an aldehyde or ketone. In this manner beta-propiolactone (also called hydracrylic acid lactone) which has the structure

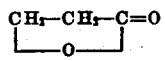

is economically obtained from ketene and formaldehyde.

We have now discovered that beta-propiolactone, and also the other beta-lactones, will react in the presence of a polar solvent for the reactants with hydrogen chloride to produce beta-chloro carboxylic acids and with hydrogen bromide to produce beta-bromo carboxylic acids. The reaction proceeds as indicated by the following equation:

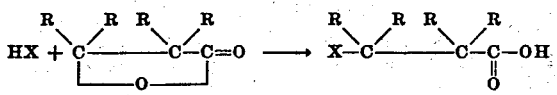

wherein X is halogen of atomic number 17 to 35 (i. e., chlorine or bromine), and R is hydrogen or a substituent radical.

In accordance with this invention, the reaction is effected in solution in a polar solvent for the reactants. When water-soluble beta-lactones are employed, water is the preferred polar solvent since aqueous solutions of hydrogen chloride and hydrogen bromide, that is, hydrochloric acid and hydrobromic acid, may then be used. However, other polar solvents for the reactants such as acetic acid and other liquid organic acids, liquid alcohols, nitro-paraffin, and the like, may also be used. When the solvent is an alcohol, the product is an ester of a beta-halo carboxylic acid, as is more fully disclosed in our copending application Serial No. 620,665, filed October 5, 1945, now Patent No. 2,422,728, patented June 24, 1947.

Other conditions and procedures for carrying out the reaction such as concentration of reactants, temperature of reaction, order of addition of reactants, amount of solvent, etc., are not critical, and may be varied as desired. It is preferable, however, to employ a molecular excess of the hydrogen halide over the beta-lactone, say from 1 to 5 or more molecular proportions of hydrogen halide to each molecular proportion of beta-lactone. Preferred temperatures for the reaction are below room temperature, say from —25° C. to 25° C., but temperatures as low as —30° C. or lower or as high as 100° C. or higher, are also operable. Highest yields of the beta-halo carboxylic acid are generally secured by slowly adding the hydrogen halide either in the gaseous form or dissolved in a polar solvent, to a solution in a polar solvent of the beta-lactone, or by adding the beta-lactone to a solution of the hydrogen halide. The beta-halo acid obtained as the product often precipitates out of solution when the solvent is water, and in any event is easily separated from the reaction mixture in substantially pure form.

The practice of the invention may further be illustrated by the following examples in which all parts are by weight:

Example 1

Gaseous hydrogen chloride is bubbled into a solution of 72 parts of beta-propiolactone dissolved in 200 parts of water for a period of about six hours, while stirring the solution and maintaining its temperature at 0 to 5° C. By the end of the addition, part of the beta-chloro-propionic acid formed is crystallized from the solution. The water is removed under vacuum and the residue is distilled. A 55% yield of beta-chloropropionic acid is thus obtained.

Example 2

72 parts of beta-propiolactone are slowly added to 200 parts of 37% aqueous hydrochloric acid, while stirring the solution and maintaining the temperature at about 28 to 30° C. From the reaction mixture about a 50% yield of beta-chloro-propionic acid is obtained.

Example 3

Hydrogen bromide is bubbled into a solution containing 72 parts of beta-propiolactone dissolved in 200 parts of water. The solution is well stirred and the temperature kept from 0 to 5° C. during addition of the hydrogen bromide, which is continued for about six hours. At the end of the addition, beta-bromo-propionic acid is present in the reaction mixture in the form of a crystalline precipitate. Upon filtering the solution and recrystallizing the precipitate from hexane, substantially pure beta-bromo-propionic acid is obtained in 85% yield.

Example 4

Hydrogen bromide is bubbled into a solution consisting of 200 parts of glacial acetic acid and 144 parts of beta-propiolactone until the solution is saturated. The solution is well-stirred and kept at a temperature between 0 and 5° C. during the addition. The reaction product is then distilled under reduced pressure. 205 parts of beta-bromo-propionic acid are thus obtained.

As illustrated in the above examples, beta-propiolactone, the simplest possible beta-lactone, is the preferred beta-lactone for use in this invention because of its low cost, and the ease with which it reacts with hydrogen chloride and hydrogen bromide to produce beta-halo propionic acids. However, the homologs of beta-propiolactone, that is, other beta-lactones of saturated aliphatic monocarboxylic acids such as beta-butyrolactone, beta-isobutyrolactone, beta-valerolactone, beta - isovalerolactone, beta-n-caprolactone, alpha-ethyl-beta-propiolactone, alpha-isopropyl-beta-propiolactone, alpha-butyl-beta-propiolactone, alpha-methyl-beta-butyrolactone, alpha - ethyl-beta-butyrolactone, beta-methyl-beta-valerolactone and the like may also be used, as may other beta-lactones, to produce numerous other beta-halo carboxylic acids. For example, when beta-butyrolactone is reacted with hydrogen chloride or hydrogen bromide, the corresponding beta-halo butyric acid is formed. Other known beta-lactones include lactones of beta-hydroxy-monocarboxylic acids containing cycloalkyl, aryl and aralkyl substituents such as beta - cyclohexyl - beta - propiolactone, beta-phenyl - beta-propiolactone, alpha-phenyl-beta-propiolactone, beta - benzyl - beta-propiolactone and the like, all of which, like beta-propiolactone and its homologs, are of the general structure

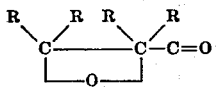

wherein R is hydrogen or an unreactive hydrocarbon group, (i. e., a hydrocarbon group free from aliphatic unsaturation) and may be prepared in the manner described in the above-mentioned Küng patent. Still other known beta-lactones include lactones of unsaturated beta - hydroxy - carboxylic acids, mono - beta-lactones of dicarboxylic acids and dilactones or dicarboxylic acids in which at least one of the lactones is beta, examples of which are alpha, alpha - dimethyl - beta-propiolactone-beta-carboxylic acid; trimethyl - beta - propiolactone-beta-carboxylic acid; beta, beta-dimethyl-beta-propiolactone-alpha-carboxylic acid; trimethyl-beta-propiolactone-alpha-carboxylic acid and the beta-delta-dilactone of citrylidene malonic acid, all of which, like the beta-lactones before mentioned, are composed exclusively of hydrogen, carbon and carbonoxy

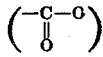

oxygen atoms. In addition to these compounds, other compounds containing the structure

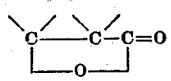

but having the valences on the alpha and beta carbons attached to groups containing elements other than or in addition to carbon and hydrogen such as oxygen, nitrogen, sulfur and halogen, whether in essentially unreactive structure such as nitro groups and ether linkages or in radicals containing reactive hydrogen such as amino and hydroxy, are also beta-lactones and hence are included within the generic class of beta-lactones. Examples of such latter compounds are alpha or beta - nitrophenyl-beta-propiolactone; beta (o-nitro - m - chlorophenyl) - beta - propiolactone; beta (o-nitro-m-methoxyphenyl) - beta-propiolactone; alpha - hydroxy - beta - phenyl-beta-propiolactone and alpha-bromo-beta, beta-dimethyl - beta - propiolactone-alpha-carboxylic acid.

Thus, any of the generic class of beta-lactones may be used in the practice of this invention. When the reaction is carried out in aqueous solution, as is preferred, beta-lactones which are soluble in water (those beta-lactones containing no more than six carbon atoms possess this property) are of course used.

Numerous modifications and variations in the invention as herein described will be apparent to those skilled in the art and are within the spirit and scope of the appended claims.

We claim:
1. The method of preparing a beta-halo-propionic acid from reactants consisting of beta-propiolactone and a hydrogen halide in which the halogen has an atomic number of 17 to 35 which comprises slowly adding one of the said reactants to a solution of the other of the said reactants in a polar solvent selected from the class consisting of water and glacial acetic acid while agitating the resulting solution and maintaining its temperature at about −25 to +25° C., and then separating a beta-halo-propionic acid in which the halogen has an atomic number of 17 to 35, from the reaction mixture.

2. The method of preparing beta-chloro-propionic acid from reactants consisting of beta-propiolactone and hydrogen chloride which comprises slowly adding one of the said reactants to an aqueous solution of the other of the said reactants while agitating the resulting solution and maintaining its temperature at about −25 to +25° C., and then separating beta-chloro-propionic acid from the reaction mixture.

3. The method of preparing beta-chloro-propionic acid which comprises bringing together in aqueous solution beta-propiolactone and hydrogen chloride and separating from the reaction mixture the beta-chloro-propionic acid thus formed.

THOMAS L. GRESHAM.
FORREST W. SHAVER.

REFERENCES CITED

The following references are of record in the file of this patent:

Fittig et al., Liebig's Annalen, vol. 226, pages 326–347 (1884).
Henry, Compt. rendus (Fr. Acad.), vol. 102, pages 368–369 (1886).
Henry, Bull. Soc. Chim. de France (2), vol. 46, page 65 (1886).
Bentley et al., J. Chem. Soc. (London), vol. 69, page 174 (1896).
Wislicenus, Liebig's Annalen, vol. 233, pages 101–116 (1886).
Blaise, Compt. rendus (Fr. Acad. Sci.), vol. 124, pages 89–90 (1897).
Blaise, Bull. Soc. Chim. de France (3), vol. 29, pages 335–336 (1903).
Blanc, Bull. Soc. Chim. de France (3), vol. 33, pages 886–890 (1905).
Wholgemuth, Compt. rendus, vol. 158, pages 1577–1578 (1914).
Johansson, Ber. (Deut. Chem. Gessell.), vol. 48, pages 1262–1266 (1915).
Johansson, Chem. Zentrallblatt, vol. 1916 II, page 557.
Walton, Jour. Chem. Soc. 1940, pages 438–442.
MacArdle, "Solvents in Synthetic Org. Chem." (1925), pages 1–3.
Spencer et al., Jour. Am. Chem. Soc., vol. 63 pages 1281–1285 (1941).

Certificate of Correction

Patent No. 2,449,993.  September 28, 1948.

THOMAS L. GRESHAM ET AL.

It is hereby certified that error appears in the printed specification of the above numbered patent requiring correction as follows:

Column 3, lines 28 to 31, for the equation reading and that the said Letters Patent should be read with this correction therein that the same may conform to the record of the case in the Patent Office.

Signed and sealed this 7th day of June, A. D. 1949.

[SEAL]

THOMAS F. MURPHY,
*Assistant Commissioner of Patents.*